United States Patent
Tokunaga et al.

(10) Patent No.: US 6,183,713 B1
(45) Date of Patent: Feb. 6, 2001

(54) METHOD FOR PRODUCING NITROGEN TRIFLUORIDE BY GAS-SOLID REACTION

(75) Inventors: Nobuyuki Tokunaga; Shirou Moroi; Keizo Kojima, all of Yamaguchi (JP)

(73) Assignee: Central Glass Company, Limited, Ube (JP)

( * ) Notice: Under 35 U.S.C. 154(b), the term of this patent shall be extended for 0 days.

(21) Appl. No.: 09/315,406

(22) Filed: May 20, 1999

(30) Foreign Application Priority Data

May 22, 1998 (JP) .................................................. 10-140653
Feb. 8, 1999 (JP) .................................................. 11-030333

(51) Int. Cl.[7] .................................................. C01B 21/06
(52) U.S. Cl. .................................................. 423/406
(58) Field of Search .................................................. 423/406, 659

(56) References Cited

U.S. PATENT DOCUMENTS

| | | | |
|---|---|---|---|
| 2,596,610 | * 5/1952 | Shabaker | 423/659 |
| 3,304,248 | 2/1967 | Fullam et al. | |
| 3,838,524 | * 10/1974 | Hencke et al. | 423/659 |
| 3,961,024 | 6/1976 | Vitek | |
| 4,157,245 | * 6/1979 | Mitchell et al. | 423/659 |
| 4,543,242 | * 9/1985 | Aramaki et al. | 423/406 |
| 5,637,285 | 6/1997 | Coronell et al. | |

FOREIGN PATENT DOCUMENTS

| | | |
|---|---|---|
| 366 078 | 10/1989 | (EP) . |
| 501933 | 2/1992 | (EP) . |
| 2 146 978 | 5/1985 | (GB) . |
| 55-8926 | 3/1980 | (JP) . |

* cited by examiner

*Primary Examiner*—Wayne Langel
(74) *Attorney, Agent, or Firm*—Evenson, McKeown, Edwards & Lenahan, P.L.L.C.

(57) ABSTRACT

The invention relates to a method for producing nitrogen trifluoride by gas-solid reaction. This method includes the steps of (a) providing a packed-bed-type vessel filled with a particulate solid of an ammonium complex of a metal fluoride; (b) introducing a fluorine-containing gas into the vessel to allow the fluorine-containing gas to flow upwardly through the vessel such that fluorine of the fluorine-containing gas is reacted with the particulate solid in the vessel, thereby to obtain a reaction gas containing nitrogen trifluoride; and (c) separating the nitrogen trifluoride from the reaction gas. A part of the reaction gas flowing out of the vessel may be introduced into the vessel, and thereby circulated through the vessel. The yield of nitrogen trifluoride becomes substantially improved by this method.

15 Claims, 2 Drawing Sheets

METHOD FOR PRODUCING NITROGEN TRIFLUORIDE BY GAS-SOLID REACTION

BACKGROUND OF THE INVENTION

The present invention relates to methods for producing nitrogen trifluoride which is useful as a dry etching gas or cleaning gas.

Nitrogen trifluoride ($NF_3$) is a colorless gas under normal conditions and has a boiling point of about −129° C. This compound has conventionally been used as a fluorine source in the preparation of fluoroolefins and also as an oxidizer for a high-energy fuel. Furthermore, much attention has recently been devoted to the usefulness of this compound as a dry etching gas, which is able to leave no residue during the production of semiconductors, and as a cleaning gas for devices of chemical vapor deposition (CVD).

Nitrogen trifluoride is produced usually by direct fluorination of ammonia in vapor phase or by electrolysis of ammonium hydrogenfluoride. Vapor phase reaction between hydrogen azide and oxygen difluoride is also known. U.S. Pat. No. 3,304,248 proposes to carry out reaction between nitrogen and fluorine by forcing nitrogen gas heated to a temperature above 1,000° C. to pass through a plasma arc and simultaneously introducing fluorine gas into a post-arc region very close to the anode. The reactions in these methods are vapor phase reactions which are relatively violent and not easy to control. Furthermore, according to these methods, the yield of nitrogen trifluoride is relatively low.

Japanese Patent Second Provisional Publication JP-B55-8926 (1980) proposes to prepare nitrogen trifluoride by reaction between ammonium hydrogenfluoride in molten state with fluorine gas. This method, however, does not seem industrially favorable firstly because the gas-liquid reaction in this method is not so easy to control and causes significant corrosion of the apparatus and also because the yield of nitrogen trifluoride is relatively low.

U.S. Pat. No. 4,543,242, corresponding to Japanese Patent First Provisional Application JP-A-60-71503 (1985), discloses the production of nitrogen trifluoride with good yields by reaction between fluorine gas and an ammonium complex of a metal fluoride, which is in solid phase. This reaction is easy to control. However, it is further desired to provide a method for producing nitrogen trifluoride with good yields better than those of the above-mentioned methods.

SUMMARY OF THE INVENTION

It is therefore an object of the present invention to provide a method for producing nitrogen trifluoride with high yields.

According to the present invention, there is provided a method for producing nitrogen trifluoride. This method comprises providing a vessel filled with a particulate solid of an ammonium complex of a metal fluoride; introducing a fluorine-containing gas into the vessel to allow the fluorine-containing gas to flow upwardly through the vessel such that fluorine of the fluorine-containing gas is reacted with the particulate solid in the vessel, thereby to obtain a reaction gas containing nitrogen trifluoride; and separating the nitrogen trifluoride from the reaction gas.

DESCRIPTION OF THE PREFERRED EMBODIMENTS

Figure 1:
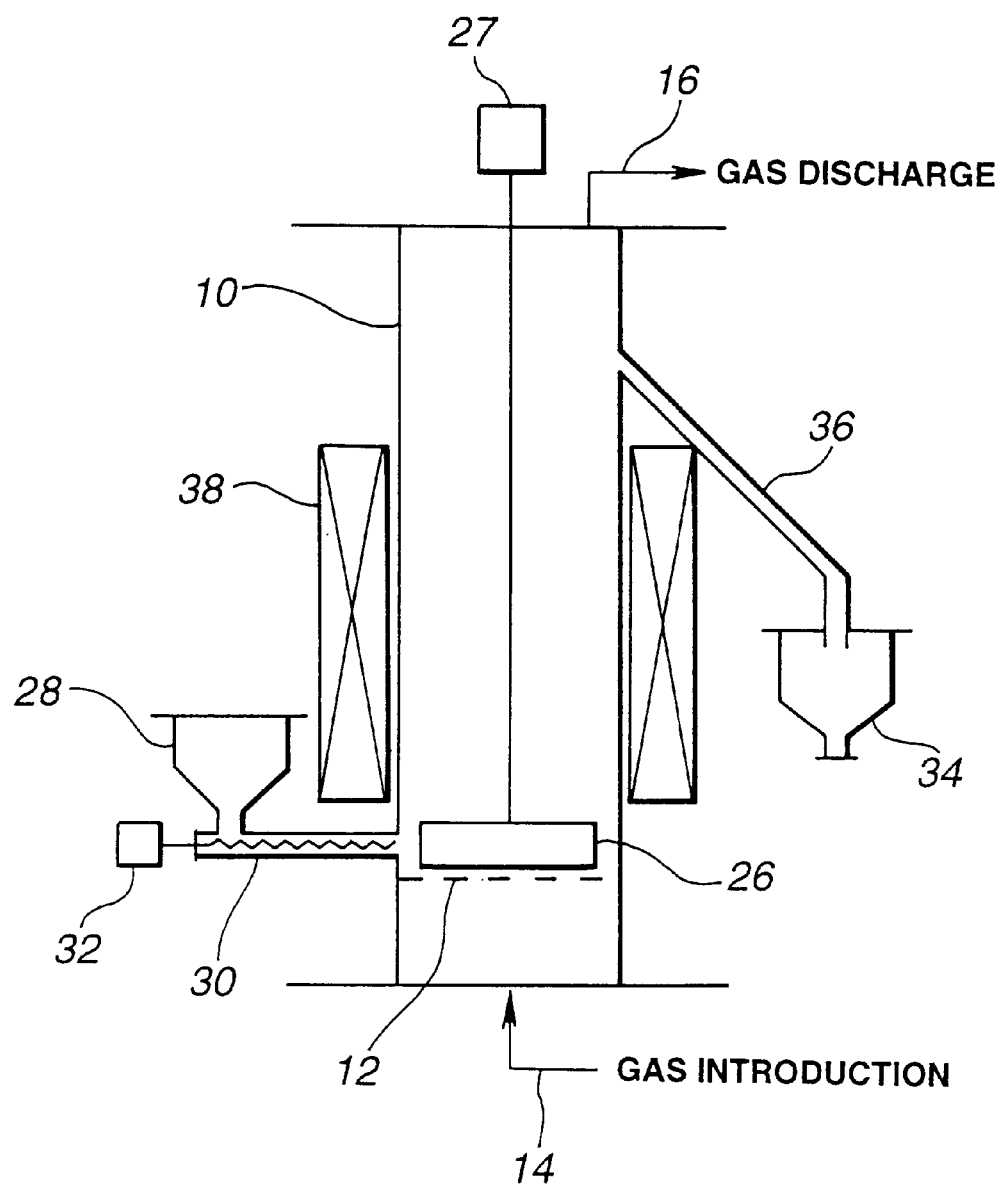
FIG. 1 is a schematic view showing a vertical vessel according to a first preferred embodiment of the present invention.
Figure 2:
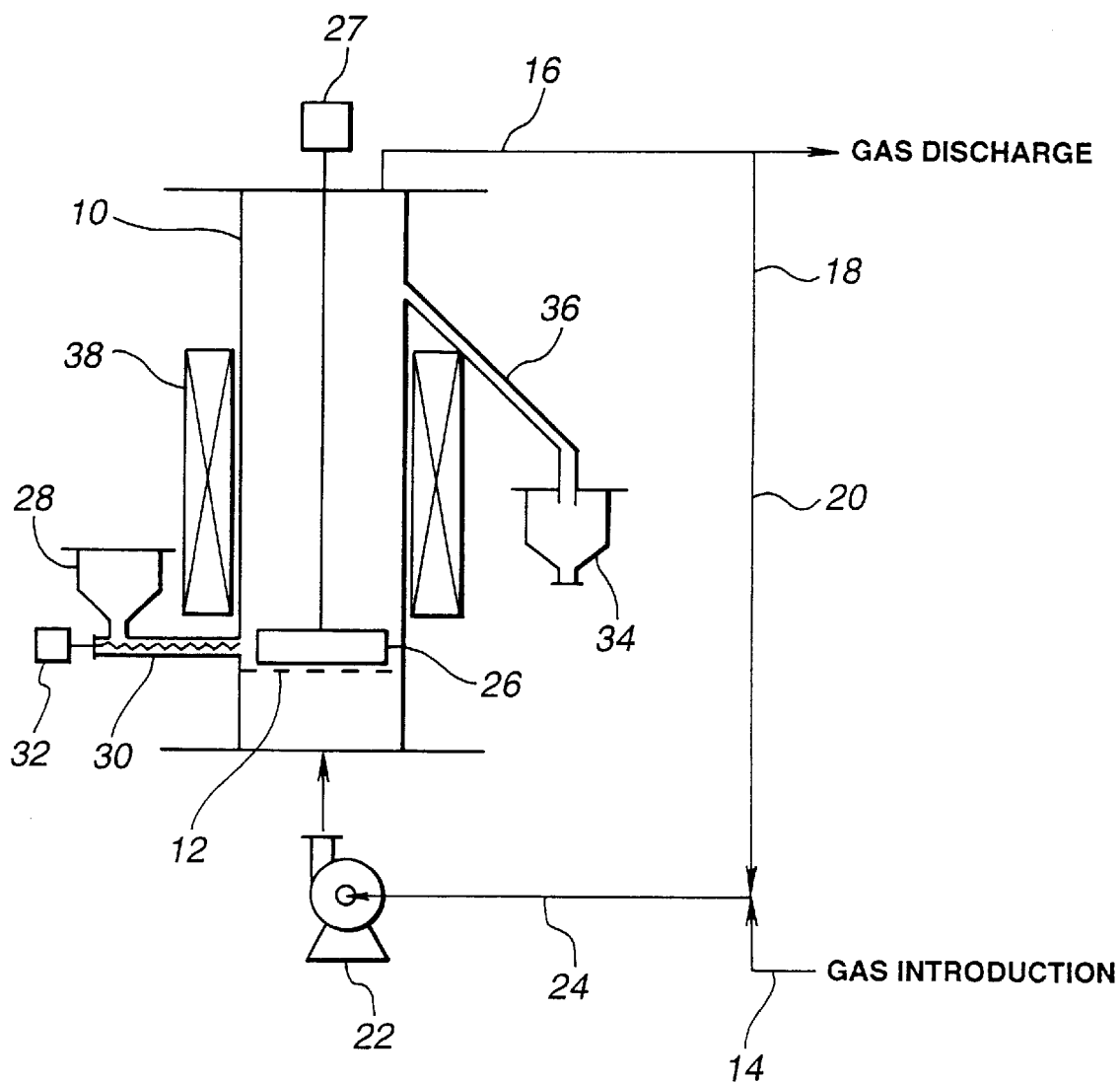
FIG. 2 is a view similar to FIG. 1, but showing another slightly modified one according to a second preferred embodiment of the present invention.

With reference to FIGS. 1 and 2, first and second methods each for producing nitrogen trifluoride, which are respectively in accordance with the first and second preferred embodiments of the present invention, will be described in detail in the following.

In these methods, as shown in FIGS. 1 and 2, a packed-bed-type vertical vessel 10 is provided. This vessel 10 is filled with a particulate solid of an ammonium complex of a metal fluoride. This particulate solid is placed on a catch basin or perforated plate 12. Then, as shown in FIG. 1, a fluorine-containing gas 14 is introduced into a bottom portion of the vessel to allow the fluorine-containing gas to flow upwardly through the vessel. With this, fluorine gas thereof is reacted with the particulate solid in the vessel, thereby to obtain a reaction gas (gaseous product) 16 containing nitrogen trifluoride. This reaction is considered to be represented by a reaction formula shown in U.S. Pat. No. 4,543,242, of which disclosure is incorporated herein by reference in its entirety. It is assumed that the contact between the particulate solid and fluorine gas of the fluorine-containing gas is substantially increased by the use of a vertical packed-bed-type vessel. This is able to substantially improve the yield of nitrogen trifluoride.

As is seen from FIG. 1, the first method is conducted by not introducing the reaction gas 16 into the vessel. In contrast, the second method is conducted, as shown in FIG. 2, by introducing a part 18 of the reaction gas 16 flowing out of the vessel through a circulation line 20 into the bottom portion of the vessel, together with the fluorine-containing gas 14. In other words, a part of the reaction gas is circulated through the vessel. As will be clarified in the after-mentioned Examples, the reaction gas 16 discharged from the vessel may be subjected to the removal of impurity gases, such as $F_2$, HF and $N_2O$. It becomes possible to greatly increase the concentration of nitrogen trifluoride in the thus subjected reaction gas due to the circulation of a part of the reaction gas in the second method. After the removal of impurity gases, the reaction gas may be condensed to liquid, followed by degassing to remove unwanted substances other than nitrogen trifluoride. In the second method, it becomes possible to substantially decrease the amount of nitrogen trifluoride (gas) taken out of the system together with an inert gas (e.g., $N_2$) during this degassing, due to the above-mentioned increased concentration of nitrogen trifluoride therein. As a result, according to the second method, it becomes possible to substantially improve the recovery of nitrogen trifluoride.

In the second method, as shown in FIG. 2, it is preferable to use a compression pump or a blower 22 for introducing a part of the reaction gas discharged from the vessel. In the second method, the fluorine-containing gas 14 may be introduced into any portion of the vessel, besides its bottom portion shown in FIG. 2, since a part of the reaction gas is circulated through the vessel. In the second method, the fluorine-containing gas 14 may consist essentially of fluorine gas. This is preferable, since it becomes possible to increase the $NF_3$ concentration of the reaction gas. In this case, it is preferable to introduce a blend 24 of fluorine gas and a part of the result gas, into the vessel, as explained hereinafter. Alternatively, the fluorine-containing gas may contain an inert gas, such as nitrogen, for the dilution of fluorine gas.

In the first and second methods, it is preferable to agitate the particulate solid in the vessel in order to increase the contact between fluorine gas and the particulate solid. With this, it becomes possible to further improve the yield of $NF_3$. The agitation may be conducted by using an agitating blade 26 driven by a motor 27 (see FIGS. 1 and 2). The shape of the agitating blade is not particularly limited, and it may have a shape of paddle, turbine, screw, or ribbon.

As shown in FIGS. 1 and 2, it is preferable that, during the introduction of the fluorine-containing gas into the vessel, the particulate solid is additionally supplied to the vessel in a continuous manner, and at the same time the particulate solid is continuously discharged from the vessel such that the particulate solid has a constant level in the vessel, thereby continuously react fluorine of the fluorine-containing gas with the particulate solid. With this, the productivity of $NF_3$ can be enhanced. Furthermore, the continuous supply and continuous discharge of the particulate solid can easily be achieved, since the vessel is a vertical packed-bed-type one. The manner of continuously supplying the particulate solid is not particularly limited. For example, it may be supplied from a vessel 28 for receiving the particulate solid, through a screw conveyor 30 driven by a motor 32, as shown in FIGS. 1 and 2. Alternatively, the particulate solid can be supplied only by inserting, into the vessel, an end portion of a pipe filled with the particulate solid, in case that the particulate solid is agitated in the vessel or that the flow rate of the fluorine-containing gas is substantially high. The manner of continuously discharging the particulate solid from the vessel is also not particularly limited. For example, it may be conducted by using a screw conveyor or by overflow shown in FIGS. 1 and 2. The discharge by overflow is particularly preferable, because it does not require any complicated devices and is able to easily maintain the particulate solid at a constant level or height. The overflowed particulate solid may be collected in a vessel 34 through a discharge pipe 36, as shown in FIGS. 1 and 2.

In the invention, examples of the metal fluoride ammonium complex are $(N_H)_3AlF_6$, $(NH_4)_3FeF_6$, $(NH_4)_2TiF_6$, $(NH_4)_3VF_6$, $(NH_4)_3CrF_6$, $(NH_4)_3MnF_6$, $(NH_4)_3CoF_6$, $(NH_4)_3CuF_6$, $(NH_4)_2ZrF_6$, $NH_4NbF_6$, $NH_4WF_7$, $(NH_4)_2SiF_6$, $(NH_4)_2SnF_6$, $(NH_4)_2PbF_6$, $(NH_4)_2SbF_6$, $(NH_4)_2GeF_6$, $(NH_4)_2NaAlF_6$, $(NH_4)_2NaFeF_6$, $(NH_4)_2KAlF_6$, $(NH_4)_2KFeF_6$, $NH_4NaSiF_6$, and $NH_4KSiF_6$. Of these, $(NH_4)AlF_6$, $(NH_4)_2NaAlF_6$, and $(NH_4)_3FeF_6$ are particularly preferable, since they are readily available and since it becomes possible to produce $NF_3$ with good yield and to easily control the reaction.

In the invention, the inside of the vessel or the particulate solid is adjusted during the reaction to having a temperature preferably from 10 to 250° C., more preferably from 50 to 200° C. If it exceeds 250° C., the yield of $NF_3$ may become too low. Furthermore, it may cause some disadvantages, such as the reaction being out of control. If it is lower than 10° C., the reaction rate may become too low. As a result, the yield of $NF_3$ may become too low.

In the invention, the fluorine concentration of the fluorine-containing gas to be introduced into the vessel is preferably not greater than 5 vol %, in case that the fluorine-containing gas is singly introduced into the vessel, as shown in FIG. 1. If it is greater than 5 vol %, too much of the reaction heat may be generated in the vessel. As a result, it may become difficult to make the temperature of the inside of the vessel fall within a range of 10–250° C. The lower limit of the fluorine concentration is not particularly limited, and it is preferably not less than 0.5 vol % in view of the productivity of $NF_3$. A diluting gas to adjust the fluorine concentration to not greater than 5 vol % is not particularly limited, so long as the diluting gas does not have an influence on the reaction. The diluting gas may be an inert gas such as $N_2$, Ar, He, etc. In case that a blend 24 of the fluorine-containing gas and a part of the reaction gas is introduced into the vessel, as shown in FIG. 2, the fluorine concentration of this blend is preferably not greater than 5 vol %. In this case, it is optional to omit the diluting gas. In other words, fluorine gas may be blended with a part of the reaction gas such that the fluorine concentration of the resultant blend is adjusted to not greater than 5 vol %.

In the invention, it is preferable to introduce the fluorine-containing gas or the above-mentioned blend to the vessel in a manner that a superficial velocity of the fluorine-containing gas or the blend to flow upwardly through the vessel is not less than 1 cm/s. This superficial velocity is defined as being Q/A, where Q is the volume of the fluorine-containing gas or the blend introduced into the vessel per unit amount of time at 25° C. and 1 atmosphere, and A is a cross-sectional area of the vessel, perpendicular to the direction of the flow of the fluorine-containing gas or the blend in the vessel. A superficial velocity not greater than 1 cm/s does not cause particular problems. However, if the superficial velocity is not less than 1 cm/s, the fluidity of the particulate solid may become sufficiently high. As a result, it is possible to increase the contact between the particulate solid and fluorine gas, and thereby to increase the yield of $NF_3$. Furthermore, if the superficial velocity is not less than 1 cm/s, it may become easy to maintain the temperature of the inside of the vessel constant. With this, it may become easier to control the reaction.

In the invention, the particulate solid has an average particle diameter of preferably not less than 100 $\mu$m. If it is less than 100 $\mu$m, the number of the solid particles thrown out of the vessel may become too many. With this, it may become difficult to conduct the reaction stably or may cause clogging of the discharge pipe with the solid particles.

As mentioned above, the reaction gas may contain impurity gases such as $F_2$, HF and $N_2O$. Thus, the reaction gas can be subjected to the removal of these gases therefrom and then a certain purification, thereby to obtain $NF_3$ with high purity.

It is needless to say that the first method can be conducted by using the vessel 10 shown in FIG. 2 under a condition that the circulation line 20 is closed.

The following nonlimitative examples are illustrative of the present invention. The following Examples 1–6 are in accordance with the first method of the first preferred embodiment of the invention, and the following Examples 7–12 are in accordance with the second method of the second preferred embodiment of the invention.

EXAMPLE 1

In this example, a vertical packed-bed-type vessel 10 shown in FIG. 1 was used in the production of $NF_3$. In fact, a part of the reaction gas flowing out of the vessel was not introduced into the vessel. The vessel was equipped with an agitating device, a particulate solid supplying device, and a particulate solid discharge device. The agitating device had an agitating, two-blade paddle (width: 100 mm and height: 25 mm) 26 and a motor 27 for driving the paddle. The particulate solid supplying device had a particulate-solid supply vessel 28, a screw conveyor 30 for conveying the particulate solid, and a motor 32 for driving the screw conveyor. The particulate solid discharge device had a particulate solid receiving vessel 34 and a particulate discharge pipe 36.

At first, the vessel (inside diameter: 130 mm and height: 500 m) was charged with 3,000 g of a particulate solid of $(NH_4)_3AlF_6$ having an average particle diameter of 300 μm. Then, while the agitating paddle was rotated at a rate of 100 rpm for agitating the particulate solid, the inside of the vessel was heated to 110° C. by an outside heater 38 in an atmosphere of nitrogen. Then, it was started to introduce a gas mixture (fluorine-containing gas) of $F_2$ and $N_2$, of which fluorine concentration was 2.0 vol %, into the bottom of the vessel at a flow rate of 50 SLM, in a manner to have a superficial velocity of 6.3 cm/s and to allow the fluorine-containing gas to flow upwardly through the vessel. At the same time when the introduction of the fluorine-containing gas was started, it was also started to continuously supply the particulate solid of $(NH_4)_3AlF_6$ at a rate of 2.0 g/min from the supply vessel 28 through the screw conveyor 30. After some time, the overflowed particulate solid started to come out of the vessel, and the discharged particulate solid was received in the vessel 34 through the discharge pipe 36. The temperature of the inside of the vessel increased from 110° C. to 145° C. and became constant at 145° C. by the introduction of the fluorine-containing gas.

In some time after confirming that the temperature of the inside of the vessel became constant, a reaction gas 16 discharged from the vessel was analyzed with a gas chromatograph. In fact, HF gas (a by-product) in the reaction gas was completely removed by passing the reaction gas through a cold trap and then treating it with NaF. By the analysis, the reaction gas was found to contain 0.59 vol % of $NF_3$. The yield of $NF_3$ on the basis of $F_2$ was found to be 87% by the expression (a/b)×c where a is the $NF_3$ concentration (vol %) of the reaction gas, b is a third of the $F_2$ concentration (vol %) of the fluorine-containing gas, and c is [100−(the $F_2$ concentration (vol %) of the fluorine-containing gas)−(⅔)].

EXAMPLE 2

In this example, Example 1 was repeated except in that the fluorine-containing gas was introduced at a flow rate of 70 SLM, in place of 50 SLM, in a manner to have a superficial velocity of 8.8 cm/s and that the particulate solid was supplied at a rate of 2.5 g/min, in place of 2.0 g/min.

In some time after the introduction of the fluorine-containing gas, the overflowed particulate solid started to come out of the vessel, and the discharged particulate solid was received in the vessel through the discharge pipe. The temperature of the inside of the vessel increased from 110° C. to 145° C. and became constant at 145° C. by the introduction of the fluorine-containing gas.

By the same analysis as that of Example 1, the reaction gas was found to contain 0.57 vol % of $NF_3$. The yield of $NF_3$ on the basis of $F_2$ was found to be 84%, by the same expression as that of Example 1.

EXAMPLE 3

In this example, Example 1 was repeated except in that the agitating paddle was rotated at a rate of 150 rpm, that a gas mixture ($F_2$ concentration: 4.0 vol %) of $F_2$ and $N_2$ was introduced at a flow rate of 40 SLM in a manner to have a superficial velocity of 5.0 cm/s, and that the particulate solid was supplied at a rate of 2.5 g/min.

In some time after the introduction of the fluorine-containing gas, the overflowed particulate solid started to come out of the vessel, and the discharged particulate solid was received in the vessel through the discharge pipe. The temperature of the inside of the vessel increased from 110° C. to 155° C. and became constant at 155° C. by the introduction of the fluorine-containing gas.

By the same analysis as that of Example 1, the reaction gas was found to contain 1.1 vol % of $NF_3$. The yield of $NF_3$ on the basis of $F_2$ was found to be 80% by the same expression as that of Example 1.

EXAMPLE 4

In this example, Example 1 was repeated except in that the vessel was charged with a particulate solid of $(NH_4)_3AlF_6$ having an average particle diameter of 200 μm.

In some time after the introduction of the fluorine-containing gas, the overflowed particulate solid started to come out of the vessel, and the discharged particulate solid was received in the vessel through the discharge pipe. The temperature of the inside of the vessel increased from 110° C. to 150° C. and became constant at 150° C. by the introduction of the fluorine-containing gas.

By the same analysis as that of Example 1, the reaction gas was found to contain 0.57 vol % of $NF_3$. The yield of $NF_3$ on the basis of $F_2$ was found to be 84% by the same expression as that of Example 1.

EXAMPLE 5

In this example, Example 1 was repeated except in that the vessel was charged with a particulate solid of $(NH_4)_2NaAlF_6$ having an average particle diameter of 300 μm and that this particulate solid of $(NH_4)_2NaAlF_6$ was continuously supplied to the vessel.

In some time after the introduction of the fluorine-containing gas, the overflowed particulate solid started to come out of the vessel, and the discharged particulate solid was received in the vessel through the discharge pipe. The temperature of the inside of the vessel increased from 110° C. to 150° C. and became constant at 150° C. by the introduction of the fluorine-containing gas.

By the same analysis as that of Example 1, the reaction gas was found to contain 0.55 vol % of $NF_3$. The yield of $NF_3$ on the basis of $F_2$ was found to be 81% by the same expression as that of Example 1.

EXAMPLE 6

In this example, Example 1 was repeated except in that the vessel was charged with a particulate solid of $(NH_4)_3FeF_6$ having an average particle diameter of 300 μm and that this particulate solid of $(NH_4)_3FeF_6$ was continuously supplied to the vessel.

In some time after the introduction of the fluorine-containing gas, the overflowed particulate solid started to come out of the vessel, and the discharged particulate solid was received in the vessel through the discharge pipe. The temperature of the inside of the vessel increased from 110° C. to 200° C. and became constant at 200° C. by the introduction of the fluorine-containing gas.

By the same analysis as that of Example 1, the reaction gas was found to contain 0.54 vol % of $NF_{13}$. The yield of $NF_3$ on the basis of $F_2$ was found to be 80% by the same expression as that of Example 1.

EXAMPLE 7

In this example, a vertical packed-bed-type vessel 10 shown in FIG. 2, which is substantially the same as that of Example 1 in construction, except the provision of a circulation line 20 for circulating a part 18 of the reaction gas 16, was used in the production of $NF_3$. In fact, a part of the reaction gas flowing out of the vessel was introduced into the vessel.

At first, the vessel was charged with 3,000 g of a particulate solid of $(NH_4)_3AlF_6$ having an average particle diameter of 300 μm. After that, air was evacuated from the vessel with a vacuum pump, and then $N_2$ was introduced into the vessel to have atmospheric pressure. Then, it was started to drive a circulating blower 22 in order to introduce a circulation gas into the bottom portion of the vessel at a flow rate of 50 SLM in a manner to have a superficial velocity of 6.3 cm/s and allow the circulation gas to flow upwardly through the vessel. Then, while the agitating paddle was rotated at a rate of 100 rpm for agitating the particulate solid, the inside of the vessel was heated to 110° C. by an outside heater 38. Then, it was started to introduce fluorine gas at a rate of 1.0 SLM into the vessel by driving the circulating blower 22. As a matter of fact, it was started to introduce a blend of the circulating gas and fluorine gas into the vessel. At the same time upon this, it was started to continuously supply the particulate solid of $(NH_4)_3AlF_6$ to the vessel at a rate of 2.0 g/min from the supply vessel 28 through the screw conveyor 30. After some time, the overflowed particulate solid started to come out of the vessel, and the discharged particulate solid was received in the vessel 34 through the discharge pipe 36. The temperature of the inside of the vessel increased from 110° C. to 145° C. and became constant at 145° C. by the introduction of fluorine gas.

A reaction gas 16 discharged from the vessel was passed through a combination of KOH, a cold trap and NaF, thereby to completely remove $F_2$ and HF from the reaction gas. The thus treated reaction gas was passed through a packed bed filled with molecular sieve 4A, thereby to remove $N_2O$ therefrom. In some time after confirming that the temperature of the inside of the vessel became constant, the resultant gaseous product flowing out of the above-mentioned molecular sieve 4A was condensed to liquid in a trap for 2 hr using liquid nitrogen, followed by degassing of this trap with a vacuum pump to remove unwanted substances, which have not been liquefied. The amount of $NF_3$ (liquid) remained in the trap was 110 g, and the yield of $NF_3$ on the basis of $F_2$ was found to be 87% by the expression (a/b)×100 where a is the weight of $NF_3$ (liquid) remained in the trap, and b is the expression of the $F_2$ flow rate (NL/min)×120 (min)÷22.4(NL/mol)÷3×71(g/mol).

EXAMPLE 8

In this example, Example 7 was repeated except in that the circulation gas was introduced at a flow rate of 70 SLM, in place of 50 SLM, in a manner to have a superficial velocity of 8.8 cm/s, that fluorine gas was introduced at a flow rate of 1.4 SLM, in place of 1.0 SLM, and that the particulate solid was supplied at a rate of 2.5 g/min, in place of 2.0 g/min.

In some time after the introduction of a blend of the circulation gas and fluorine gas, the overflowed particulate solid started to come out of the vessel, and the discharged particulate solid was received in the vessel through the discharge pipe. The temperature of the inside of the vessel increased from 110° C. to 145° C. and became constant at 145° C. by the introduction of fluorine gas.

The amount of $NF_3$ (liquid) remained in the trap was 150 g. The yield of $NF_3$ on the basis of $F_2$ was found to be 85% by the same expression as that of Example 7.

EXAMPLE 9

In this example, Example 7 was repeated except in that the circulation gas was introduced at a flow rate of 40 SLM in a manner to have a superficial velocity of 5.0 cm/s, that the agitating paddle was rotated at a rate of 150 rpm, that fluorine gas was introduced at a flow rate of 1.6 SLM, and that the particulate solid was continuously supplied at a rate of 2.5 g/min.

In some time after the introduction of a blend of the circulation gas and fluorine gas, the overflowed particulate solid started to come out of the vessel, and the discharged particulate solid was received in the vessel through the discharge pipe. The temperature of the inside of the vessel increased from 110° C. to 155° C. and became constant at 155° C. by the introduction of fluorine gas.

The amount of $NF_3$ (liquid) remained in the trap was 160 g. The yield of $NF_3$ on the basis of $F_2$ was found to be 79% by the same expression as that of Example 7.

EXAMPLE 10

In this example, Example 7 was repeated except in that the vessel was charged with a particulate solid of $(NH_4)_3AlF_6$ having an average particle diameter of 200 μm.

In some time after the introduction of a blend of the circulation gas and fluorine gas, the overflowed particulate solid started to come out of the vessel, and the discharged particulate solid was received in the vessel through the discharge pipe. The temperature of the inside of the vessel increased from 110° C. to 145° C. and became constant at 145° C. by the introduction of fluorine gas.

The amount of $NF_3$ (liquid) remained in the trap was 105 g. The yield of $NF_3$ on the basis of $F_2$ was found to be 83% by the same expression as that of Example 7.

EXAMPLE 11

In this example, Example 7 was repeated except in that the vessel was charged with a particulate solid of $(NH_4)_2NaAlF_6$ having an average particle diameter of 300 μm and that this particulate solid of $(NH_4)_2NaAlF_6$ was continuously supplied to the vessel.

In some time after the introduction of a blend of the circulation gas and fluorine gas, the overflowed particulate solid started to come out of the vessel, and the discharged particulate solid was received in the vessel through the discharge pipe. The temperature of the inside of the vessel increased from 110° C. to 150° C. and became constant at 150° C. by the introduction of fluorine gas.

The amount of $NF_3$ (liquid) remained in the trap was 100 g. The yield of $NF_3$ on the basis of $F_2$ was found to be 79% by the same expression as that of Example 7.

EXAMPLE 12

In this example, Example 7 was repeated except in that the vessel was charged with a particulate solid of $(NH_4)_3FeF_6$ having an average particle diameter of 300 μm and that this particulate solid of $(NH_4)_3FeF_6$ was continuously supplied to the vessel.

In some time after the introduction of a blend of the circulation gas and fluorine gas, the overflowed particulate solid started to come out of the vessel, and the discharged particulate solid was received in the vessel through the discharge pipe. The temperature of the inside of the vessel increased from 110° C. to 200° C. and became constant at 200° C. by the introduction of fluorine gas.

The amount of $NF_3$ (liquid) remained in the trap was 100 g. The yield of $NF_3$ on the basis of $F_2$ was found to be 79% by the same expression as that of Example 7.

The entire disclosure of Japanese Patent Application Nos. 10-140653 filed on May 22, 1998 and 11-30333 filed on Feb.

8, 1999, of which priorities are each claimed in the application, including specification, claims, drawings, and summary, is incorporated herein by reference in its entirety.

What is claimed is:

1. A method for producing nitrogen trifluoride, said method comprising:

providing a vessel filled with a particulate solid of an ammonium complex of a metal fluoride;

introducing a fluorine-containing gas into said vessel to allow said fluorine-containing gas to flow upwardly through said vessel such that said fluorine-containing gas has an upward superficial velocity through said vessel of not less than 1 cm/s, wherein the superficial velocity is defined as O/A where Q is the volume of said fluorine-containing gas introduced into said vessel per unit amount of time at 25° C. and 1 atmosphere and A is the cross-sectional area of said vessel perpendicular to the flow of said fluorine-containing gas through said vessel, and agitating said particulate solid during said introducing, such that fluorine of said fluorine-containing gas is reacted with said particulate solid in said vessel, thereby to obtain a reaction gas containing nitrogen trifluoride; and separating said nitrogen trifluoride from said reaction gas.

2. A method according to claim 1, wherein a part of said reaction gas flowing out of said vessel is introduced into said vessel, and thereby circulated through said vessel.

3. A method according to claim 1, wherein, during said introducing, said particulate solid is additionally supplied to said vessel in a continuous manner, and at the same time said particulate solid is continuously discharged from said vessel such that said particulate solid has a constant level in said vessel, thereby continuously react fluorine of said fluorine-containing gas with said particulate solid.

4. A method according to claim 1, wherein said ammonium complex is at least one selected from the group consisting of $(NH_4)_3AlF_6$, $(NH_4)_2NaAlF_6$, and $(NH_4)_3FeF_6$.

5. A method according to claim 1, wherein, during said introducing, an inside of said vessel is adjusted to having a temperature of 10–250° C.

6. A method according to claim 5, wherein said temperature is from 50 to 200° C.

7. A method according to claim 1, wherein a fluorine concentration of said fluorine-containing gas is not greater than 5 vol %.

8. A method according to claim 7, wherein said fluorine concentration is not less than 0.5 vol %.

9. A method according to claim 1, wherein said particulate solid has an average particle diameter of not less than 100 $\mu$m.

10. A method according to claim 2, wherein a blend of said part of said reaction gas and said fluorine-containing gas is introduced into said vessel such that a fluorine concentration of said blend is adjusted to not greater than 5 vol %.

11. A method according to claim 10, wherein said fluorine-containing gas consists essentially of fluorine gas.

12. A method according to claim 10, wherein said fluorine-containing gas comprises at least one inert gas selected from the group consisting of $N_2$, Ar and He.

13. A method according to claim 1, wherein said fluorine-containing gas comprises at least one inert gas selected from the group consisting of $N_2$, Ar and He.

14. A method according to claim 1, wherein said particulate solid is agitated by driving an agitating blade.

15. A method according to claim 14, wherein said agitating blade is an agitating paddle.

* * * * *